Figure 1:
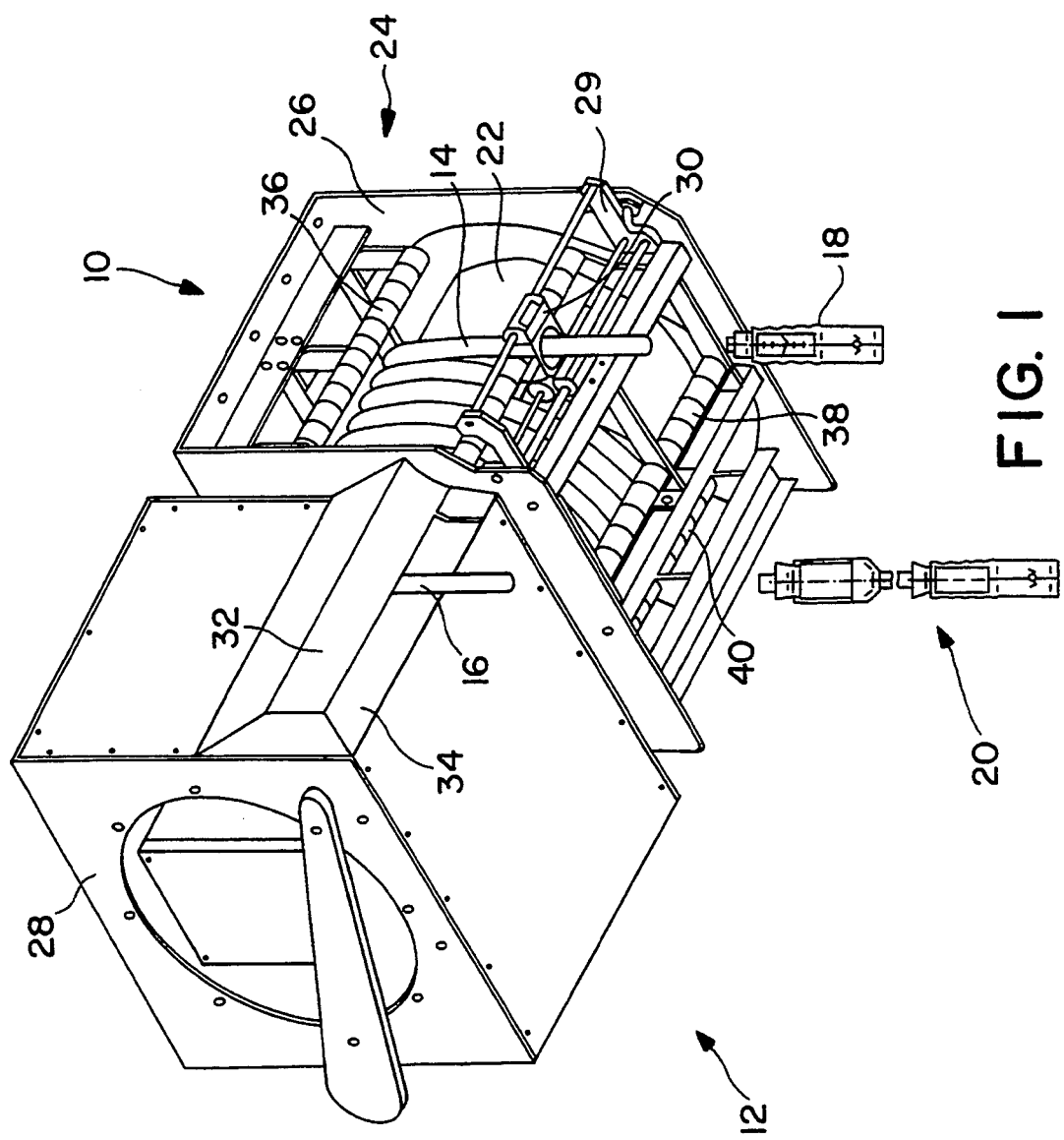

United States Patent [19]
Fladung

[11] Patent Number: 5,358,190
[45] Date of Patent: Oct. 25, 1994

[54] DEVICE FOR STOWING AWAY THICK CABLES

[75] Inventor: Manfred Fladung, Mömbris, Fed. Rep. of Germany

[73] Assignee: Manfred Fladung GmbH, Fed. Rep. of Germany

[21] Appl. No.: 966,054

[22] PCT Filed: Jul. 4, 1991

[86] PCT No.: PCT/EP91/01259
§ 371 Date: Dec. 31, 1992
§ 102(e) Date: Dec. 31, 1992

[87] PCT Pub. No.: WO92/01323
PCT Pub. Date: Jan. 23, 1992

[30] Foreign Application Priority Data
Jul. 5, 1990 [DE] Fed. Rep. of Germany ....... 9010213

[51] Int. Cl.$^5$ .............................................. B65H 75/02
[52] U.S. Cl. .................................. 242/388; 242/407;
191/12.20 R; 254/333
[58] Field of Search ............ 242/77, 54 R, 85, 86.5 R,
242/86.6, 86.61; 191/12.2 R, 12.2 A; 254/333

[56] References Cited
U.S. PATENT DOCUMENTS

| | | | |
|---|---|---|---|
| 2,486,167 | 10/1949 | Jurasevich | 191/12.2 |
| 2,533,592 | 12/1950 | Landon | 254/333 |
| 3,106,366 | 10/1963 | Bernard | 242/77 |
| 3,372,887 | 3/1968 | Ladany | 242/107.13 |
| 3,843,094 | 10/1974 | Watts | 254/333 |
| 4,066,093 | 1/1978 | Egerstrom | 242/54 R |

FOREIGN PATENT DOCUMENTS

| | | |
|---|---|---|
| 0163025 | 3/1985 | European Pat. Off. . |
| 3347965 | 11/1985 | Fed. Rep. of Germany . |
| 80/00643 | 4/1980 | World Int. Prop. O. . |
| 86/105632 | 9/1986 | World Int. Prop. O. . |

Primary Examiner—Daniel P. Stodola
Assistant Examiner—John Q. Nguyen
Attorney, Agent, or Firm—Bierman and Muserlian

[57] ABSTRACT

A device (10) for stowing away a thick cable (14, 16) composed of several leads, in particular the supply cable of a central energy supply installation for the supply system on board of aircrafts, for example. The device has a rotary winding drum, around which several turns of the cable can be wound, connected in turn by a compensating cable (40) preferably to a fixed connection. The leads of the compensating cable, that lie free at least in sections, extend in the axial direction of the winding drum, so that the compensating cable is more strongly twisted when the connecting cable unwinds from the winding drum and less strongly twisted when the connecting cable is wound on the winding drum. The winding drum (24) itself has a hollow cylindrical bearing body (22) for winding up a single layer of cable (14, 16), within which extends the compensating cable (46). Preferably, the compensating cable (46) or some of its leads are held or fixed in an approximately central position within the bearing body (22). In order to obtain a friction-reducing support of the cable (14, 16), rotatably mounted sliding elements (36, 38, 40), such as ball bearing shafts that cooperate with each other, extend parallel to the axis of the cable winding roller (24), spaced apart therefrom.

16 Claims, 6 Drawing Sheets

DEVICE FOR STOWING AWAY THICK CABLES

The invention relates to a device for stowing away a cable composed of several leads, in particular a supply cable for a central energy supply system on board aircraft, for example, comprising a rotary winding drum having a hollow cylindrical bearing body for single-layer winding of several turns of the cable, which in its turn is connected by a compensating cable inside the bearing body preferably to a fixed connection, with the compensating cable being more strongly twisted in the axial direction of the winding drum and less strongly when wound onto the winding drum.

A corresponding stowing device is known from WO-A-80/00643. The cable inside the cylindrical bearing body is twisted more or less around the shaft depending on the circumference of the wound or unwound energy supply cable. For thick cables, a device of this type is unsuitable, since twisting over the full length of the compensating cable would not be possible.

A stowing device is known from, for example, EP-B-0 163 025. The winding roller comprises two drum disks, between which lies the connecting cable in its wound state. The distance between the two drum disks is matched to the diameter of the connecting cable such that the wound layers are next to one another in one plane. The connecting cable is, in its wound state, virtually coiled onto an inner face of one of the drum disks. The winding drum itself, which is preferably disposed underneath the passenger boarding bridge. has a vertical rotation axis. The arrangement of the connecting cable ensures that it is not twisted during winding and unwinding, which might otherwise result in a break in the leads forming the connecting cable. The connection between the connecting cable and the fixed connection such as a junction box, i.e. the compensating cable, is coiled inside a dome-shaped housing section in the known proposal, with the leads being exposed to prevent them breaking. These leads accordingly resemble a kitchen whisk, which is twisted into a more or less marked coil shape depending on whether the connecting cable is wound or unwound.

This proposal permits a considerable increase in the effective length of the connecting cable for stowing on the winding drum in comparison with systems in which a compensating drum associated with the winding drum is provided and on which a compensating cable can be wound having a length corresponding to that of the connecting cable (DE-C 33 47 965).

In a cable winding device according to U.S. Pat. No. 2,486,167, a cable to be unwound or wound is passed through a receptacle that is movable in the longitudinal direction of the winding device by means of a spindle.

In a cable drum according to U.S. Pat. No. 3,106,366, movement of the cable over sliding elements designed as rollers is known.

The object underlying the present invention is to develop a device of the type described at the outset such that it is is very compact in design yet provides the possibility of accommodating without difficulty thick cables that can be frequently wound and unwound, without damage in particular to the compensating cable.

The object is attained in accordance with the invention substantially in that the compensating cable or leads thereof exposed in sections are held by a receptacle approximately centrally inside the bearing body.

By the measures in accordance with the invention, that section of the compensating cable inside the bearing body is subdivided into two sections of preferably equal length, as a result of which the twist effect is divided up, permitting a greater number of rotations in the appropriate direction compared to other systems, but without the compensating cable being subjected to an undesirable degree of loading.

To prevent the receptacle causing constraint forces in addition when the compensating cable is rotated and twisted, the receptacle is designed to rotate about the longitudinal axis of the winding drum and relative to said drum.

In particular, the receptacle can be a disk element having at least one aperture intended for passing through the compensating cable and extending in the axial area of the winding drum.

It is possible to provide the receptacle with several apertures in the axial area of the winding roller, through which apertures leads of the compensating cable are passed.

In accordance with a further proposal, the receptacle is a disk element held by guides extending from the inner wall of the bearing body, said element thereby being rotatable relative to the winding drum while avoiding high frictional forces.

In accordance with another proposal, the receptacle can be a disk element projecting from a shaft, with said shaft extending along the rotation axis of the winding drum and being rotatable in relation to the winding drum.

With a horizontal rotation axis of the winding drum, the compensating cable inside the bearing body has, when the cable is wound on, a sinusoidal course, i.e. the sections between the end faces of the winding drum and the receptacle sag.

The winding drum itself can be disposed in a rectangular housing, with a cable leadthrough slot running parallel to the longitudinal axis of the winding drum, along which slot a guide is slidably disposed through which the cable is passed to the outside. This guide can be moved along the axis of the winding drum by means of a worm gear, such that the guide is always in that area in which the cable is being wound onto or unwound from the bearing body. The rotation of the winding drum and the displacement of the guide element are accordingly synchronous.

In a device with the winding drum disposed underneath a passenger boarding bridge, the rotation axis of the winding drum is horizontal or substantially horizontal. This is a further difference from the known stowing devices. Thanks to the horizontal arrangement, flange-mounting of the drive system such as a geared motor on an end face of the housing is possible without difficulty in order to impart to the winding drum the required rotation direction.

To permit easy winding and unwinding of the cable, rotatably mounted sliding elements are provided for friction-reducing support of the cable at a distance from the cable winding roller and axis-parallel to said roller. In particular, the sliding elements are cylindrical elements running axis-parallel to the bearing body.

In order to ensure problem-free winding and unwinding of the heavy cable in an underfloor system in particular, the cylindrical elements, distributed at a distance from one another around the circumference of the bearing body, interact with one another. The cylindrical elements can be connected to one another preferably by gears and by chains or belts engaging in the former.

An independent solution proposal for a device of the type described at the outset is characterized in that the winding drum has a hollow cylindrical bearing body for single-layer winding of the cable, inside which body is the compensating cable, which or whose leads are held or fixed in position approximately centrally in the bearing body, and in that rotatably mounted sliding elements interacting with one another and axis-parallel to the bearing body are provided for friction-reducing support of the cable.

Further details, advantages and features of the invention possibly distinguishing the invention per se are given not only in the claims and in the features they describe—singly and/or in combination—but also in the following description of a preferred embodiment as shown in the drawings.

Figure 2:
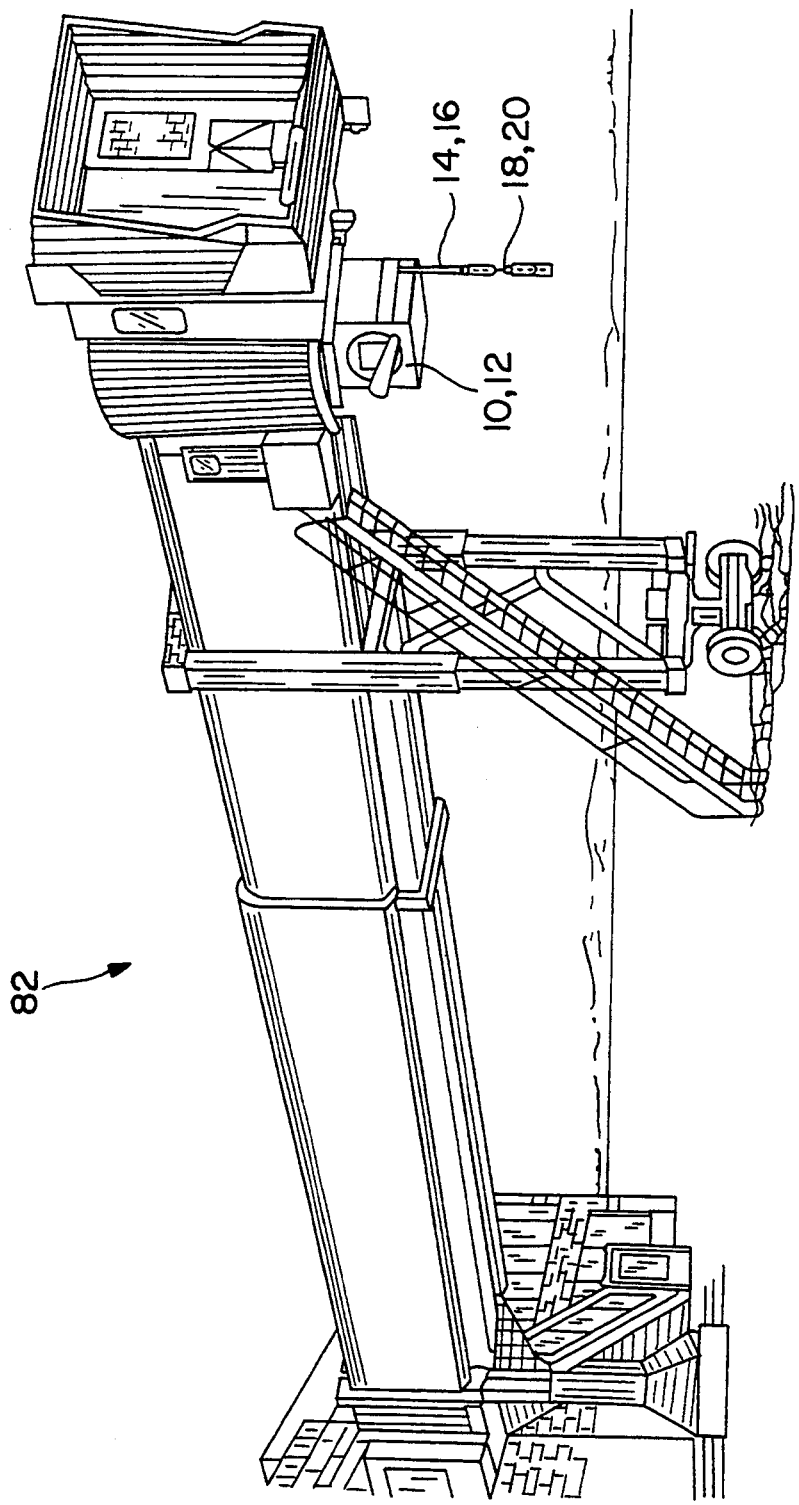
Figure 3:
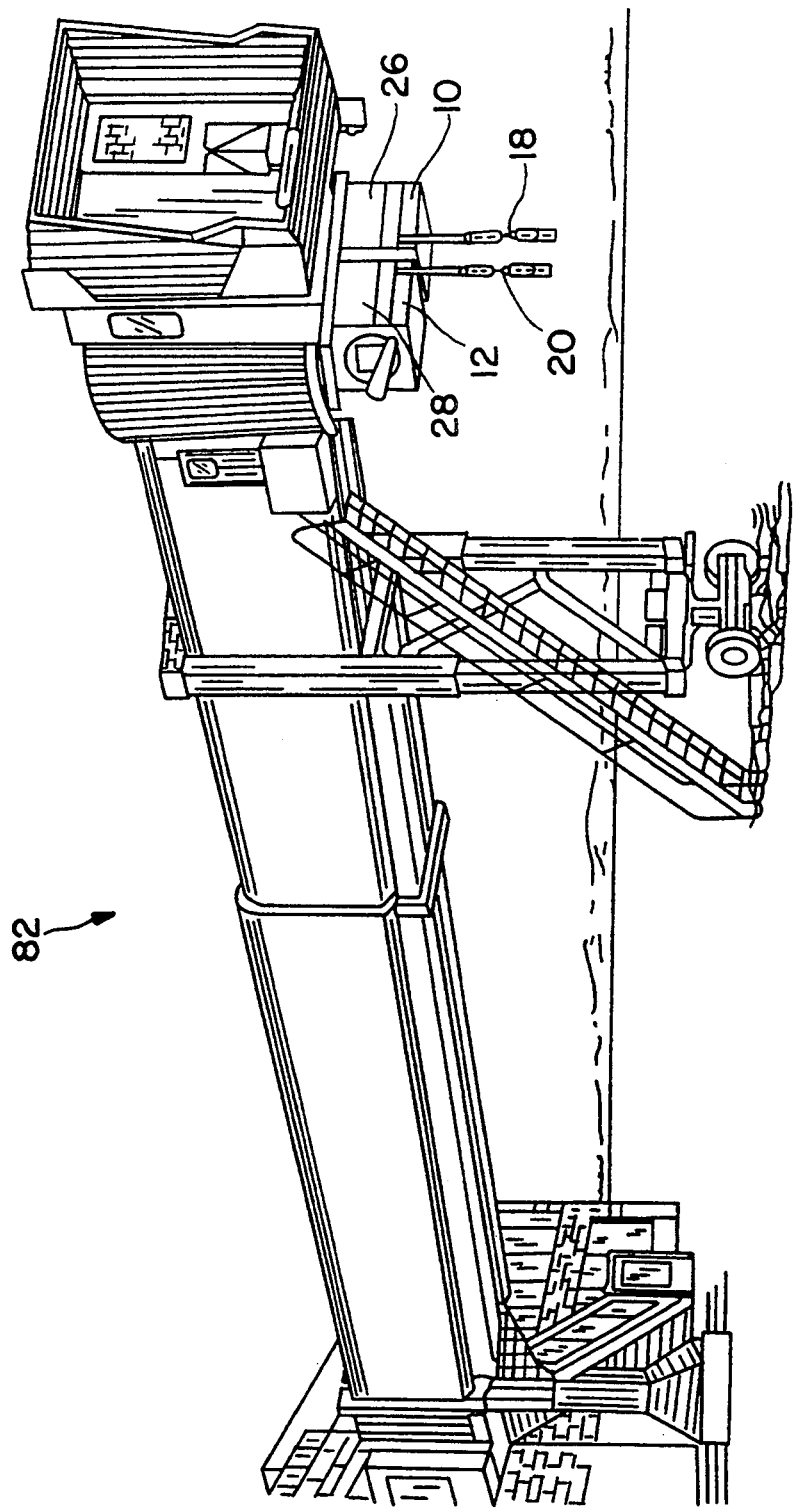
Figure 5:
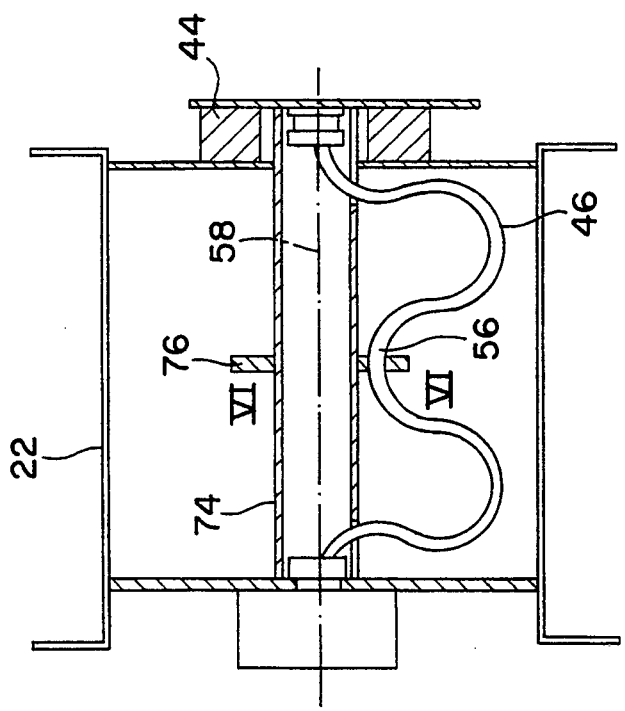
Figure 4:
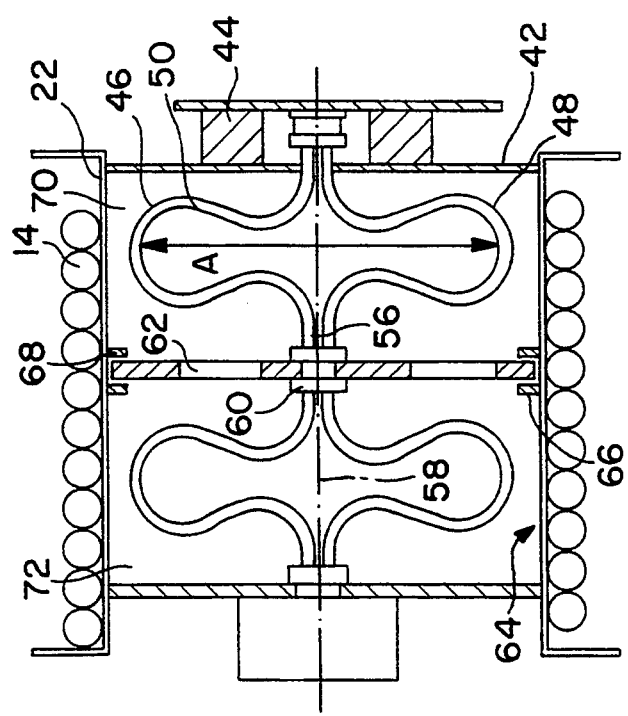
Figure 6:
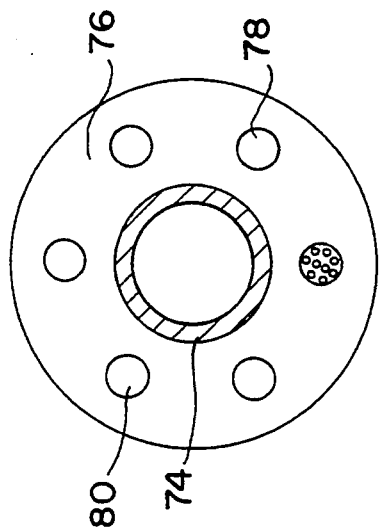
Figure 7:
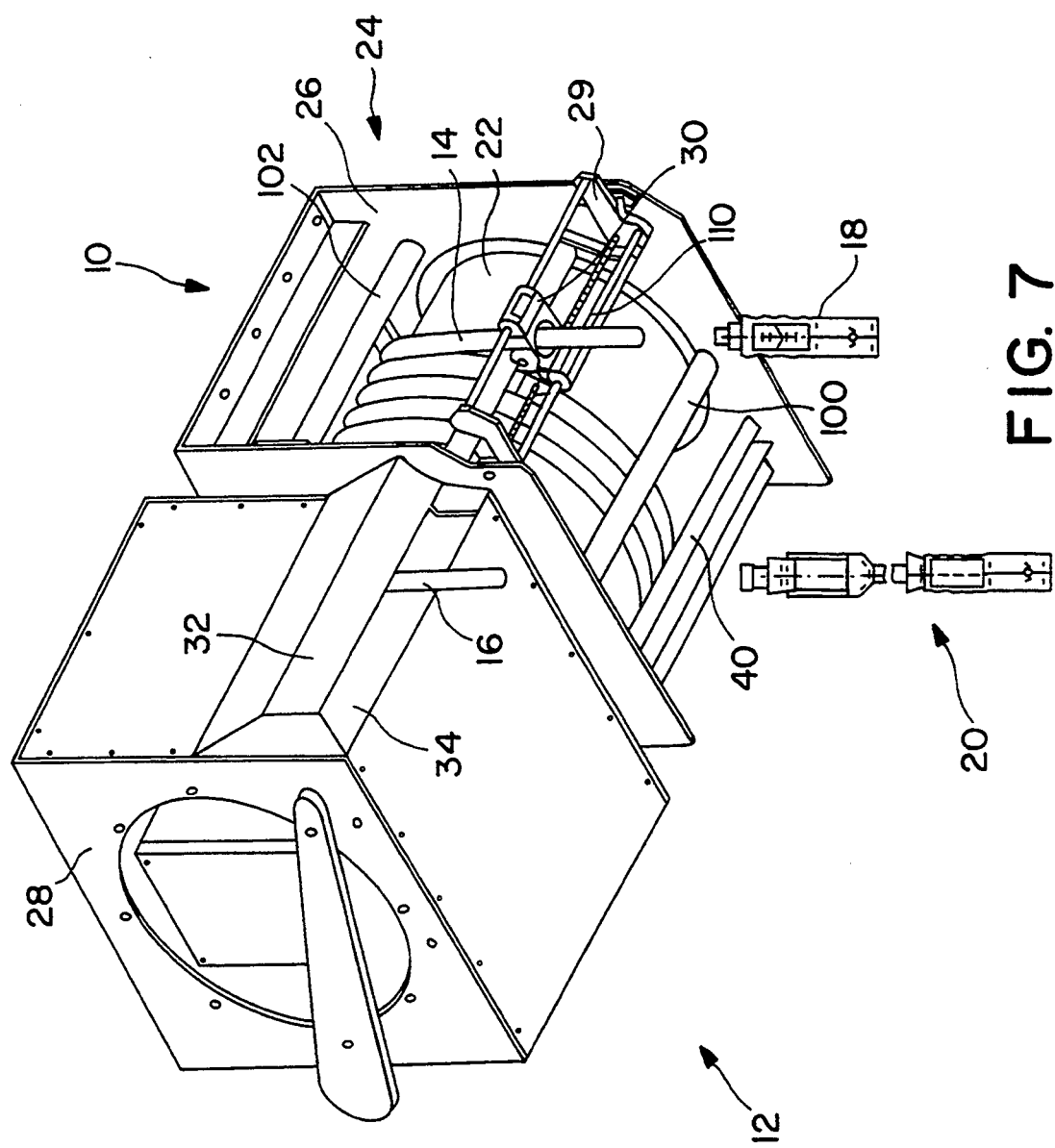
Figure 9:
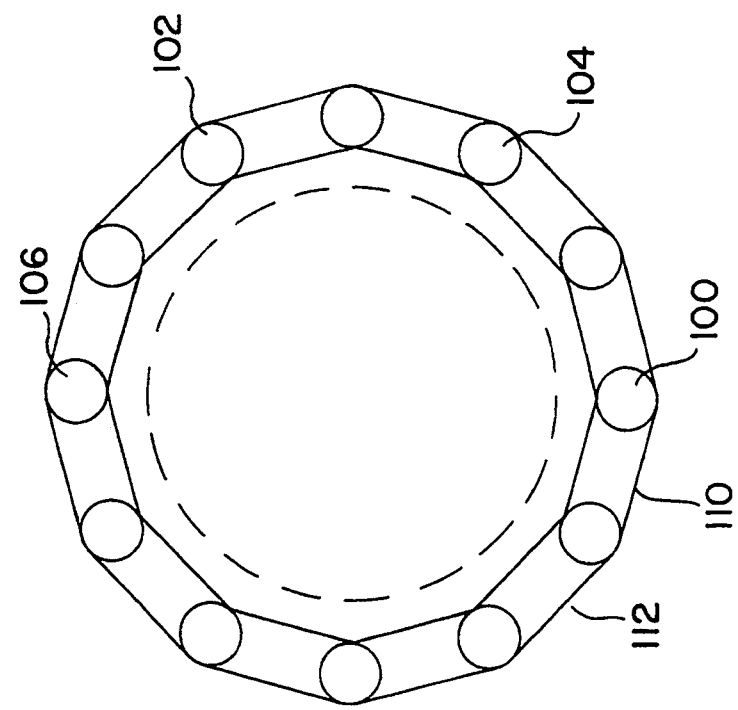
Figure 8:
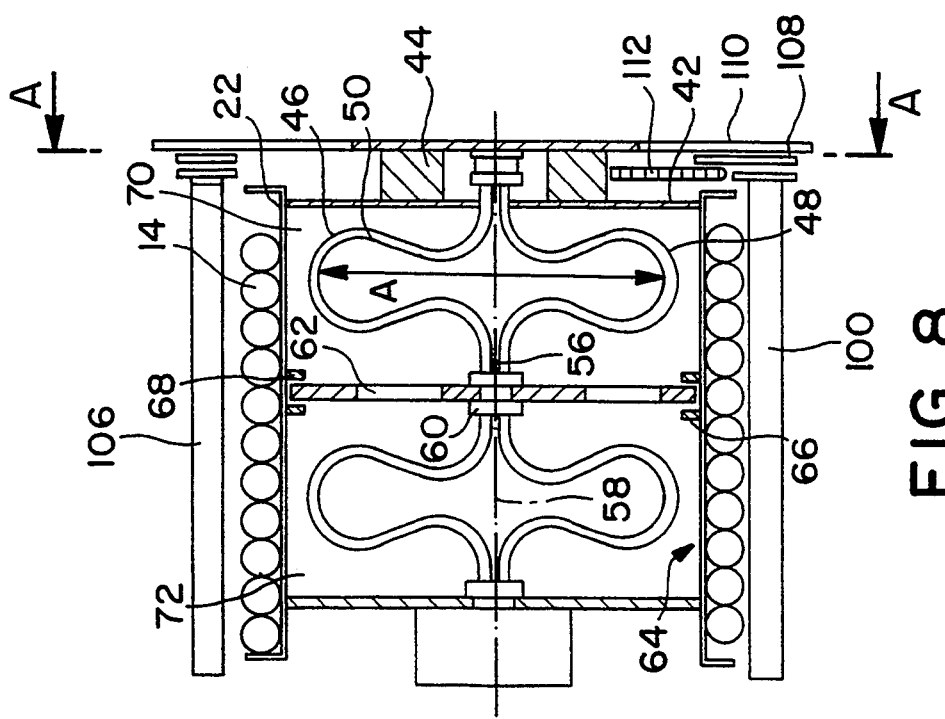

In the drawings,

FIG. 1 shows two cable stowing devices disposed adjacent to one another, one of which is shown with its housing parts removed, FIG. 2 shows a device disposed underneath an passenger boarding bridge, FIG. 3 shows a passenger boarding bridge with two stowing devices disposed adjacent to one another, FIG. 4 shows a section through a first embodiment of a stowing device, FIG. 5 shows a section through a second embodiment of a stowing device with the cable left out, FIG. 6 shows a section along the line IV—IV in FIG. 5, FIG. 7 shows an alternative embodiment to FIG. 1, FIG. 8 shows an alternative embodiment to FIG. 4, and FIG. 9 shows a section AA in FIG. 8.

FIG. 2 shows two adjacently disposed stowing devices (10) each for one thick cable (14) or (16) in particular, said cable being made of several leads and used to supply aircraft, for example, from a central energy supply system. The cables (14) and (16) can have a diameter of, for example, 46 mm, and contain in addition to cable leads for the 400 Hz 3-phase AC supply a large number of control lines. Connectors (18) and (20), preferably designed as panels, are provided at the ends of the cables (14) and (16) respectively and can be inserted into corresponding receptacles of the aircraft.

Each stowing device (10) consists of a winding drum (24) comprising a hollow cylindrical bearing body (22), onto which drum the cable (14) is wound in a single layer, i.e. several turns of the cable (14) are in adjacent rows.

The winding drum (24), i.e. the bearing body (22), is rotatably mounted in a housing (26) or (28), and its driving power is provided by a geared motor, for example.

The cable (14)—like cable (16)—is guided by a guide (30) slidable using a threaded spindle system (29) parallel to the longitudinal—and hence the rotation—axis of the winding drum (24), the position of said guide (30) depending on the length of the wound/unwound cable (14). In other words, the guide (30) ensures that the turns of the cable (14) are close together on the bearing body (22). Accordingly, the guide (30) moves synchronously with the rotation of the winding drum (24).

The guide (30) is covered by a projecting housing section corresponding to that section of the device (12) with the reference number (32). In this area, the housing (26) or (28) has a slot (34) through which the cable (14) or (16) respectively is passed to the outside.

To prevent any chafing movements between the cable (14) or (16) and the inside of the housing (26) or (28) respectively, which lead to wear and possibly damage when the cable (14) or (16) is being wound or unwound, sliding elements, having the reference numbers (36), (38) and (40), for example, are around the circumference of the winding drum (24) and axis-parallel thereto. These sliding elements (36), (38) and (40) are rollers disposed on shafts that permit the cable (14) or (15) to slide along. The shafts holding the rollers are of course parallel to the longitudinal and hence the rotation axis of the respective winding drum.

The cable (14) or (16) is connected to a fixed connection by a compensating cable, not shown in FIG. 1, said connection being designed non-rotatable relative to the winding drum (24). In accordance with the invention, this compensating cable connecting the cable (14) or (16) to the fixed connection is on the inside of the bearing body (22) designed as a hollow cylinder, as shown in purely diagram form and as an example in FIGS. 4 and 5.

The bearing body (22) designed as a hollow cylinder rotates relative to a fixed connection shown in purely diagram form and as an example on an end wall (42), whereby a connection can lead from the fixed connection (44) to a central energy supply system not shown. A compensating cable (46) extends from the fixed connection and is identical in design to the cable (14) wound onto the bearing body but which has its leads exposed. These are shown purely as examples with the reference numbers (48) and (50). Although the Figure shows only a few leads (48), (50), the cable (14) or (16) can in practice have scores of individual leads.

The compensating cable (46) runs to the end wall firmly connected to the bearing body (22) and opposite the fixed connection (44), in order to pass from there to the thick and largely inflexible cables (14) and (16) leading out of the stowing device (10) or (12).

Inside the bearing body (22), the leads (48), (50) are freely rotatable and resemble in shape a kitchen whisk converging at the center (56). By center is meant here the intersection of the central and hence rotation axis (58) with the transverse axis running through the center of the bearing body (22).

The constriction (56) is achieved by one or more apertures (60) in a disk element (62) in the area of the axis through which the leads (48) and (50) are passed. The disk element (62) is designed rotatable about the axis (58) and relative to the bearing body (22). To this end, the disk element is fixed between guide sections (66) and (68) projecting from the inner wall (64) of the bearing body (22).

If the cable (14) or (16) is unwound, the leads (48) and (50) are turned while being twisted simultaneously, so that the radial expansion A is reduced at the same time.

The fact that the compensating cable (46) is split into two parts (70) and (72) as a result of the constriction (56) makes it possible to distribute the twist effect to such an extent—in comparison with known devices—that the length of the cable (14) to be wound on is greater than in known devices.

While the leads (48) and (50) shown in FIG. 4 are drawn to resemble a kitchen whisk, i.e. spread in all directions, the leads (48) and (50) ought, at least in the case of a horizontal rotation axis (58) with the cable (14) wound on, to be run such that they drop due to gravity in the direction of the lowest point, resulting in the sinusoidal course as shown in FIG. 5.

The embodiment in FIG. 5 differs from that in FIG. 4 to the extent that the constriction (56) is achieved by a disk element (76) disposed on a shaft (74) and provided with peripheral apertures (78), (80) through which the leads (48), (50) of the compensating cable (46) are passed. The shaft (74), and hence the disk element (76), is rotatable about the rotation axis (58) of the winding drum (24) and hence of the bearing body (22) and relative to said body.

Other designs for achieving the constriction (56) are of course also possible. However, the intention here is to ensure that the constriction (56) is rotatable relative to the winding drum.

The stowing device (10) or (12) designed in accordance with the invention can now be placed underneath a telescopically designed passenger boarding bridge (82) as shown in FIGS. 2 and 3.

FIG. 2 shows a passenger boarding bridge having a device (10) or (12), and indicating the connector (18) or (20) respectively with the cable (14) or (16) passing to the outside through the slot (34) in the housing.

A tandem version is shown in FIG. 3, with the housings (26) and (28) containing the winding drums being arranged adjacent to one another such that the axes of the winding drums are aligned. Using a suitable structure, a single drive unit can be used to rotate the winding drums, with the possibility of using gear and clutch units, not shown, for switching on and off that winding drum of which the cable is not to be wound or unwound.

FIGS. 7 to 9 show alternative embodiments to those in FIGS. 1 and 4, to allow in particular an underfloor arrangement of the stowing device (10). Identical elements are provided here with the same reference numbers.

The embodiment in FIGS. 7 to 9 differs from that in FIGS. 1 and 4 substantially with regard to the friction-reducing sliding elements supporting the cable (14) during winding and unwinding.

In FIGS. 7 to 9, ball bearing shafts are used as the sliding elements, some of which are provided with the reference numbers (100), (102), (104) and (106) as examples. The shafts (100), (102), (104) and (106) can be made of plastic and are parallel to the rotation axis of the bearing body (22), at least over a length along which the cable (14) moves during winding and unwinding.

Each shaft (100), (102), (104) and (106) has at its end a gear (108). Gears of adjacent shafts are connected in each case via a chain or belt (110) and (112) such that when one shaft turns all the other shafts are turned too. This obviously permits a very easy rolling and unrolling action of the cable (14). Preferably, however, a shaft is positively driven.

In the embodiment, the shaft (104) is the driving shaft. This shaft can be driven by a separate motor or by the motor that turns the winding drum (24) when a transmission is inserted.

The gears and chains achieving the interaction between the shafts can of course be replaced by other elements having the same effect.

Finally, it should be pointed out that a kink preventer in the form of a pipe socket (114), for example, extends from the guide (30) to protect the cable.

I claim:

1. A device (10) for stowing away a supply cable (14, 16) composed of several leads for a central energy supply system on board an aircraft, comprising a rotary winding drum having a hollow cylindrical bearing body (22) for single-layer winding of several turns of said cable which in turn is connected by a compensating cable (46) inside the bearing body to a fixed connection, with the compensating cable extending in the axial direction of said winding drum such that said compensating cable is more strongly twisted when said connecting cable is unwound from said winding drum and less strongly when wound onto said winding drum, wherein said compensating cable (46) thereof exposed in sections are held by a receptacle (62, 76) approximately centrally in said bearing body (22) and said receptacle (62, 76) is rotatable about the rotation axis (58) of said winding drum (24) and relative to said winding drum (24).

2. A device according to claim 1, wherein said compensating cable (46) is subdivided by said receptacle (62, 76) into two sections (70, 72) of approximately equal length.

3. A device according to claim 1, wherein said receptacle (62, 76) is a disk element having at least one aperture (60, 78, 80) intended for passing through said compensating cable thereof and positioned in the axial area of said winding drum (24).

4. A device according to claim 1, wherein said receptacle (76) has several apertures (78, 80) in the axial area of said winding drum (24).

5. A device according to claim 1, wherein said receptacle (62) is a disk element held by guides (66, 68) extending from the inner wall (64) of said bearing body (22).

6. A device according to claim 1, wherein said receptacle (76) is a disk-shaped element (76) extending from a shaft (74) running along the winding drum longitudinal axis (58).

7. A device according to claim 1, wherein said compensating cable (46) has a sinusoidal course inside said bearing body (22) when said cable (14, 16) is wound on.

8. A device according to claim 1, wherein said winding drum (24) is disposed in a rectangular housing (26, 28).

9. A device according to claim 8, wherein said housing (26, 28) is provided with a cable lead-through slot (34) parallel to the longitudinal axis (58) of said winding drum (24).

10. A device according to claim 9, wherein said cable (14, 16) is passed out of said housing (26) by a guide (30) slidably disposed for movement by a worm gear in the axial direction of said winding drum (24) in the area of said slot (34).

11. A device according to claim 1, wherein rotatably mounted sliding elements (36, 38, 40) in a row are provided for friction-reducing support of said cable (14, 16) on the circumference around and at a distance from said winding drum (24) and axis-parallel thereto.

12. A device according to claim 11, wherein said sliding elements are cylindrical shafts (100, 102, 104, 106) extending axis-parallel to said bearing body (22).

13. A device according to claim 12, wherein said cylindrical elements (100, 102, 104, 106) at a distance from one another and distributed around the circumference of said bearing body (22) interact with one another.

14. A device according to claim 13, wherein said cylindrical elements (100, 102, 104, 106) are connected to one another by preferably gears (108) and chains (110, 112) or belts engaging with said gears.

15. A device according to claim 14, wherein one cylindrical element (104) is motor driven for turning the remaining cylindrical elements (100, 102, 106).

16. A device according to claim 1, with said winding drum being disposed underneath a passenger boarding bridge, wherein said rotation axis of said winding drum (24) is horizontal or substantially horizontal.

* * * * *